Dec. 11, 1951 R. B. LAWRANCE 2,578,253
PULSE MODULATOR
Filed April 3, 1946

INVENTOR
RICHARD B. LAWRANCE
BY M. O. Hayes
ATTORNEY

Patented Dec. 11, 1951

2,578,253

UNITED STATES PATENT OFFICE 2,578,253

PULSE MODULATOR

Richard B. Lawrance, Cambridge, Mass., assignor, by mesne assignments, to the United States of America as represented by the Secretary of the Navy Application April 3, 1946, Serial No. 659,184

10 Claims. (Cl. 332—9)

This invention relates to pulse type modulator circuits and more particularly to an improved method of modulating an oscillator or amplifier with a pulse of voltage.

In pulse modulating an oscillator or amplifier, it is desirable that the pulse doing the modulating have a sharp leading edge, a high flat portion and a sharp trailing edge. Such a pulse insures quick, incisive starting of oscillations and quick, decisive stopping of oscillations at the end of the pulse. Furthermore, the period immediately following the pulse should be free from any voltage conditions that might tend to retrigger the oscillator or amplifier into operation. Heretofore, no known modulator has satisfactorily incorporated all of the above desirable features.

It is a primary object of this invention to generally improve pulse type modulators.

It is an object of this invention to provide a method of modulating an oscillator with a pulse of voltage.

Another object is to provide a method of modulating an oscillator with a pulse of voltage which has a sharp leading edge, a sharp trailing edge and a flat portion between the two edges.

Another object is to provide a modulator for an oscillator which delays and damps any tendency of the oscillator to misfire.

A further object is to provide a modulator for an oscillator which assists in causing the oscillator to begin operating reliably and incisively.

Figure 1:
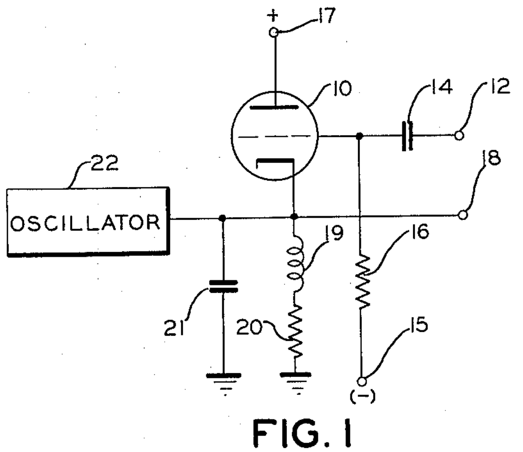
Figure 2:
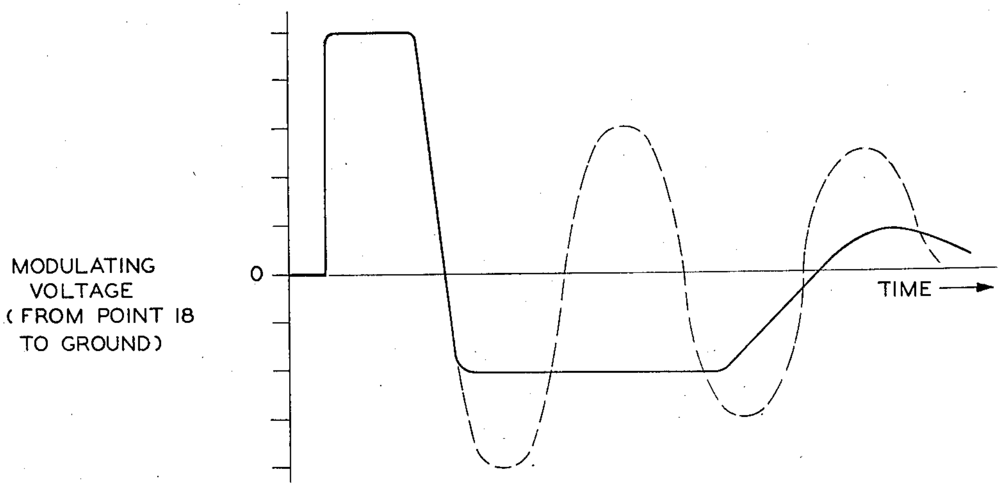

These and other objects will become apparent from the following specification when taken in conjunction with the accompanying drawing in which:

Fig. 1 is a partial-schematic, partial-block diagram of one embodiment of this invention; and Fig. 2 is a pictorial representation of voltages occurring at certain points in this embodiment.

In Fig. 1 is disclosed an electron tube 10 connected as a modified cathode follower amplifier. The grid of tube 10 is coupled to an input terminal 12 through capacitor 14. It is also coupled to an appropriate negative voltage at terminal 15 through resistor 16. A second input terminal 18 is tied directly to the cathode of tube 10 which also is connected to a network consisting of a coil 19 and resistor 20 in series, shunted by capacitor 21. One end of resistor 20 and one side of capacitor 21 are tied to ground. The cathode of tube 10 in addition is coupled to the grid circuit of a conventional oscillator represented by block 22. Capacitor 21 is of small capacity to insure a sharp leading edge of the pulse applied to oscillator 22.

In Fig. 2 are shown two curves which represent voltage values related to time that are found in the embodiment of Fig. 1.

In the operation of the embodiment disclosed in Fig. 1, electron tube 10 is biased to cut-off and beyond by the negative voltage applied at terminal 15. A large positive pulse of voltage, originating externally to the circuit of this embodiment, is fed into tube 10 between terminals 12 and 18 to overcome the bias and cause tube 10 to start conducting. When plate current begins flowing through modulator tube 10, capacitor 21 becomes quickly charged and a voltage is placed across the coil 19 and its damping resistor 20. Coil 19 is called a snuffing choke coil because it serves to snuff out undesirable oscillations in the oscillator 22 as will be shown elsewhere.

A voltage across capacitor 21 starts a current flowing through coil 19 which current starts at zero and increases with time initially at a constant rate. By the time the modulating pulse is ended, a considerable current is flowing in coil 19. When the pulse being applied to terminals 12 and 18 is removed, the plate current of tube 10 ceases, coil 19 quickly discharges capacitor 21 and swings its voltage negative. If it were not for the subsequent action of the modulator tube 10, the modulator output potential would behave somewhat as shown by the dotted curve of Fig. 2, oscillating violently in alternate negative and positive swings damped by the resistor 20 in series with the snuffing choke 19. The initial amplitude of these oscillations would depend on the inductance of the coil 19 and on the value of current flowing in it immediately prior to the end of the pulse. The values of coil 19, capacitor 21, and resistor 20 could be proportional to critically damp the oscillations, but this could only be done by compromising the rising and falling speeds of the modulator pulse.

It is definitely undesirable for the modulator output driving the oscillator 22 to fluctuate in such manner as shown by the dotted curve of Fig. 2, so it is necessary to dissipate the large energy stored in coil 19. At the same time it is desirable to have the output from modulator tube 10 become fairly negative and remain so for some time. This will allow oscillations in the oscillator circuit 22 to die out passively in between modulator output pulses. Both of the above-mentioned results are accomplished in the following manner: a large negative bias voltage is coupled to the grid of tube 10 at terminal 15.

When tube 10 cuts off at the end of the positive pulse which was impressed between terminals 12 and 18, the voltage at the cathode will drop, and its downward swing, which will be aided by the action of coil 19, will continue until it has reached the sharply-defined point at which tube 10 again begins to conduct. Since the grid has a large negative voltage coupled to it from terminal 15, the cathode of tube 10 has to become quite negative before tube 10 will conduct again. At some voltage always near this point, tube 10 will supply exactly the amount of current demanded by coil 19, therefore capacitor 21 is no longer discharging and its voltage will remain constant. Tube 10 will continue to supply the diminishing demand of coil 19 for current until this current is reduced to zero. At that time the only stored energy remaining will be that in the comparatively small by-pass condenser 21. The circuit will oscillate with but small amplitude which will soon be damped out by the resistor 20. The amplitude of this final oscillation may be controlled by adjusting the negative bias applied at terminal 15 to an appropriate value. Modulator tube 10 has a double usefulness in that in addition to transmitting the pulse to the oscillator 22, it delays and damps the tendency of the modulator output voltage to fluctuate which fluctuation might cause the oscillator to refire undesirably. Since the tendency to oscillate is damped independently of capacitor 21, this capacitor can be decreased in size to aid in increasing the sharpness of the pulse.

Referring to Fig. 2, the solid curve represents the voltage input values to the grid circuit of oscillator 22 as found in the embodiment of Fig. 1. The doted curve represents the voltage values that would be found on the grid of oscillator 22 if modulator tube 10 did not damp out the tendency of the modulator output voltage to oscillate.

This invention is to be limited only by the appended claims.

What is claimed is:

1. A device for pulse modulating electronic oscillators and amplifiers comprising, an electron tube including a plate, a cathode, and a grid, a source of negative voltage connected to said grid to bias said electron tube beyond cut off, an input circuit adapted to receive a large positive pulse of voltage and to impress said pulse on said grid causing said tube to conduct, and an output circuit for said tube including a coil and a resistor in series connected to said cathode, said coil and resistor combination acting in conjunction with said electron tube to prevent oscillations in the output of said modulating device, subsequent to the desired period of conduction.

2. A device for pulse modulating electronic oscillators and amplifiers comprising, an electron tube including a plate, a cathode and a control grid, a source of negative voltage connected to said control grid to bias said tube beyond cut-off, a coil, a resistor, said coil and said resistor being connected between said cathode and a reference point, a capacitor, said capacitor connected between said cathode and a reference point and an input circuit adapted to receive a large positive voltage pulse and to impress said pulse on said grid causing said tube to go into conduction, the output from said cathode being a large positive voltage pulse having sharply defined leading and trailing edges followed by a period of essentially constant negative voltage said inductance and resistance acting in conjunction with said tube as a unidirectional damping circuit to prevent oscillations in said output of said modulation device.

3. A device for inhibiting undesired oscillations in the output of a pulse voltage generator comprising, a load in the output circuit of said generator, and two branch circuits connected in parallel with said load, said branch circuits including an inductance and resistance in series relation in the first of said branch circuits and a capacitance in the second of said branch circuits.

4. A device for inhibiting undesired oscillations in the output of a pulse voltage generator comprising the combination with a load circuit for said generator of energy storing apparatus for hlding said output voltage at a substantially constant voltage of oppcsite polarity from that of said pulses for a period after the occurrence of said pulses.

5. A device for inhibiting undesired oscillations in the output of a pulse voltage generator comprising the combination with said generator of an output circuit including parallel arrangements of inductance and capacitance for maintaining said output voltages at a substantially constant value of opposite polarity to that of said pulses following the occurrence of said pulses.

6. Apparatus for producing voltage pulses of a predetermined shape comprising, a pulse voltage generator including an electron tube having at least a cathode, an anode and a grid, a serially arranged inductance and resistance, a capacitance, and a load, said serially arranged inductance and resistance, said capacitance, and said load all being in parallel arrangement and connected to said cathode, whereby said output voltages are caused to be in the form of substantially rectangular pulses followed by periods of substantially constant negative voltage.

7. Apparatus for producing voltage pulses of a predetermined shape comprising, a cathode follower circuit including a triode vacuum tube, means for biasing said triode vacuum tube highly negative, means for applying input pulses of positive polarity to said triode tube, said input pulses being of sufficient magnitude to overcome the negative bias, an output circuit for said triode vacuum tube including branch circuits in parallel relationship, a series connected inductor and resistor constituting one of said branch circuits and a capacitor constituting the other of said branch circuits whereby at the termination of each of said input pulses applied to said triode vacuum tube output voltage therefrom is maintained negative in polarity for a substantial period.

8. Apparatus for producing modulating pulses having trailing edges which are substantially free of oscillatory damping effects comprising, a triode vacuum tube having a cathode, a grid, and an anode, a source of positive voltage connected to said anode, a source of negative voltage connected to said grid, an oscillator for receiving said modulating pulses connected to said cathode, a first circuit in parallel to said oscillator including a series connected resistor and inductor, a second circuit in parallel with said oscillator including a capacitor, and means for applying positive pulses to said grid of sufficient magnitude to overcome the biasing effect of said negative voltage, whereby said triode vacuum tube conducts for the duration of each of said pulses, termination of each of said pulses causing cut off of said triode vacuum tube until said cathode is driven sufficiently negative by voltage from said inductor to renew conduction in said vacuum tube, the output of said vacuum tube appearing across said oscillator being substantially rectangular voltage pulses followed by a period of substantially constant negative voltage.

9. A device for inhibiting undesired oscillations in the output of a generator producing a voltage of a first polarity comprising, a load in the output circuit of said generator, two branch circuits connected in parallel with said load, said branch circuits including an inductor and a resistor in series relation in the first of said branch circuits and a capacitor in the second of said branch circuits, and means coupled to said inductor for supplying a current to said inductor upon the occurrence in said output circuit of a predetermined potential of polarity opposite to said first polarity, said current decaying with time.

10. A device for inhibiting undesired oscillations in the output of a generator producing pulses of a first polarity comprising, a load in the output circuit of said generator, two branch circuits connected in parallel with said load, said branch circuits including an inductor and a resistor in series relationship in the first of said branch circuits and a capacitor in the second of said branch circuits, and means coupled to said inductor for supplying a current to said inductor upon the occurrence in said output circuit of a predetermined potential of polarity opposite to said first polarity, said current decaying with time at a rate proportional to the decay in potential across said inductor, thereby to cause the charge on said capacitor to remain substantially unchanged for an interval following the termination of each of said pulses.

RICHARD B. LAWRANCE.

REFERENCES CITED

The following references are of record in the file of this patent:

UNITED STATES PATENTS

| Number | Name | Date |
|---|---|---|
| 2,408,061 | Grieg | Sept. 24, 1946 |
| 2,416,111 | Maxwell | Feb. 18, 1947 |
| 2,418,268 | Lawson | Apr. 1, 1947 |